United States Patent
Lee et al.

(10) Patent No.: US 9,824,791 B2
(45) Date of Patent: Nov. 21, 2017

(54) MULTILAYER ELECTRONIC COMPONENT AND CONDUCTIVE PASTE COMPOSITION FOR INTERNAL ELECTRODE

(71) Applicant: SAMSUNG ELECTRO-MECHANICS CO., LTD., Suwon-Si, Gyeonggi-Do (KR)

(72) Inventors: Young Il Lee, Suwon-Si (KR); So Yeon Song, Suwon-Si (KR); Soo Hwan Son, Suwon-Si (KR)

(73) Assignee: Samsung Electro-Mechanics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/388,101

(22) Filed: Dec. 22, 2016

(65) Prior Publication Data
US 2017/0103827 A1 Apr. 13, 2017

Related U.S. Application Data

(62) Division of application No. 14/485,485, filed on Sep. 12, 2014, now Pat. No. 9,576,697.

(30) Foreign Application Priority Data

Jun. 24, 2014 (KR) ........................ 10-2014-0077156

(51) Int. Cl.
| | |
|---|---|
| *H01F 5/00* | (2006.01) |
| *H01B 1/22* | (2006.01) |
| *H01B 1/24* | (2006.01) |
| *H01F 27/28* | (2006.01) |
| *H01F 27/29* | (2006.01) |

(Continued)

(52) U.S. Cl.
CPC ............... *H01B 1/22* (2013.01); *C03C 3/091* (2013.01); *C03C 4/14* (2013.01); *C03C 8/02* (2013.01); *C03C 8/18* (2013.01); *C09D 5/24* (2013.01); *H01B 1/24* (2013.01); *H01F 5/00* (2013.01); *H01F 27/2804* (2013.01);

(Continued)

(58) Field of Classification Search
CPC ..................... H01F 5/00; H01F 27/00–27/30
USPC ...................... 336/65, 83, 200, 232
See application file for complete search history.

(56) References Cited

U.S. PATENT DOCUMENTS

| | | |
|---|---|---|
| 7,083,744 B2 | 8/2006 | Matsuno et al. |
| 8,842,413 B2 | 9/2014 | Park et al. |

(Continued)

FOREIGN PATENT DOCUMENTS

| | | |
|---|---|---|
| JP | H06-204022 A | 7/1994 |
| JP | 07-326540 A | 12/1995 |

(Continued)

OTHER PUBLICATIONS

Japanese Office Action issueed in Application No. 2014-182975 dated Feb. 7, 2017, with English translation.

*Primary Examiner* — Tuyen Nguyen
(74) *Attorney, Agent, or Firm* — McDermott Will & Emery LLP

(57) ABSTRACT

A multilayer electronic component may include a multilayer body including a plurality of magnetic material layers, and an internal electrode disposed in the multilayer body. The internal electrode may contain a conductive metal and glass, and the glass contains a vanadium (V) oxide. Also, a conductive paste composition for an internal electrode includes a conductive metal and glass, wherein the glass contains a vanadium (V) oxide.

5 Claims, 2 Drawing Sheets

(51) Int. Cl.
- *C09D 5/24* (2006.01)
- *C03C 8/18* (2006.01)
- *C03C 8/02* (2006.01)
- *C03C 3/091* (2006.01)
- *C03C 4/14* (2006.01)

(52) U.S. Cl.
 CPC ......... *H01F 27/29* (2013.01); *C03C 2204/00* (2013.01); *C03C 2207/00* (2013.01); *H01F 2027/2809* (2013.01)

(56) References Cited

U.S. PATENT DOCUMENTS

| | | | |
|---|---|---|---|
| 8,890,647 | B2 | 11/2014 | Moon et al. |
| 2004/0144205 | A1 | 7/2004 | Matsuno et al. |
| 2007/0001152 | A1 | 1/2007 | Yoneima et al. |
| 2011/0059361 | A1* | 3/2011 | Wilkening ............ H01M 4/136 429/218.1 |
| 2012/0154977 | A1 | 6/2012 | Hur et al. |
| 2012/0295122 | A1 | 11/2012 | Park et al. |
| 2013/0154785 | A1 | 6/2013 | Yokoyama et al. |
| 2013/0257576 | A1 | 10/2013 | Arata et al. |
| 2014/0220732 | A1* | 8/2014 | Liu ................. H01L 31/022425 438/98 |

FOREIGN PATENT DOCUMENTS

| | | |
|---|---|---|
| JP | 2003-123533 A | 4/2003 |
| JP | 2004-228094 A | 8/2004 |
| JP | 2007027354 A | 2/2007 |
| JP | 2007-128730 A | 5/2007 |
| JP | 2009259826 A * | 11/2009 |
| JP | 2010-232343 A | 10/2010 |
| JP | 2011-171271 A | 9/2011 |
| JP | 2012-134120 A | 7/2012 |
| JP | 2012-244150 A | 12/2012 |
| JP | 2013-125819 A | 6/2013 |
| JP | 2013-153119 A | 8/2013 |
| JP | 2013254917 A | 12/2013 |
| WO | 2012/020694 A1 | 2/2012 |

* cited by examiner

MULTILAYER ELECTRONIC COMPONENT AND CONDUCTIVE PASTE COMPOSITION FOR INTERNAL ELECTRODE

CROSS-REFERENCE TO RELATED APPLICATION

This application is a divisional of U.S. patent application Ser. No. 14/485,485, filed Sep. 12, 2014, which claims the benefit of Korean Patent Application No. 10-2014-0077156 filed on Jun. 24, 2014, the disclosures of which are incorporated, herein by reference.

BACKGROUND

The present disclosure relates to a multilayer electronic component and a conductive paste composition for an internal electrode.

An inductor, an electronic component, is a representative passive element configuring an electronic circuit together with a resistor and a capacitor to remove noise.

In a multilayer inductor among multilayer electronic components, conductive patterns are formed on insulating layers using a magnetic material or a dielectric material as a main material, the insulating layers having the conductive patterns formed thereon are stacked to form a coil-shaped internal electrode within a multilayer body, and external electrodes for electrically connecting the internal electrode to an external circuit are formed on outer surfaces of the multilayer body.

RELATED ART DOCUMENT

Japanese Patent Laid-Open Publication No. 2007-027354

SUMMARY

Some embodiments in the present disclosure may provide a multilayer electronic component including an internal electrode having excellent specific resistance and a dense fine structure, and a conductive paste composition for an internal electrode, for implementation of the same.

According to an exemplary embodiment in the present disclosure, a multilayer electronic component in which an internal electrode disposed in a multilayer body contains a conductive metal and glass, and the glass contains a vanadium (V) oxide may be provided.

BRIEF DESCRIPTION OF DRAWINGS

The above and other aspects, features and other advantages will be more clearly understood from the following detailed description taken in conjunction with the accompanying drawings, in which.

DETAILED DESCRIPTION

Figure 1:
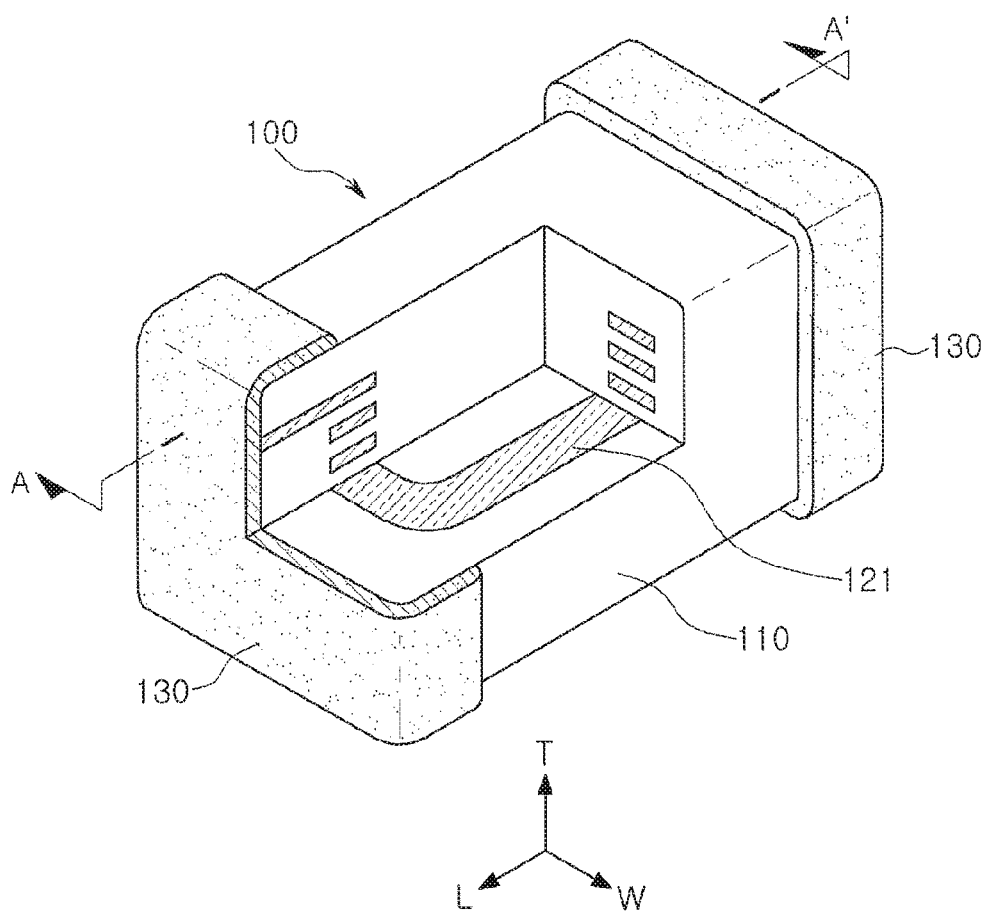
FIG. 1 is a partially cut-away perspective view of a multilayer electronic component according to an exemplary embodiment in the present disclosure.

Exemplary embodiments in the present disclosure will now be described in detail with reference to the accompanying drawings.

The disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

In the drawings, the shapes and dimension of elements may be exaggerated for clarity, and the same reference numerals will be used throughout to designate the same or like elements.

Multilayer Electronic Component

Hereinafter, a multilayer electronic component according to an embodiment in the present disclosure, in detail, a multilayer inductor will be described. However, the present disclosure is not limited thereto.

Figure 2:
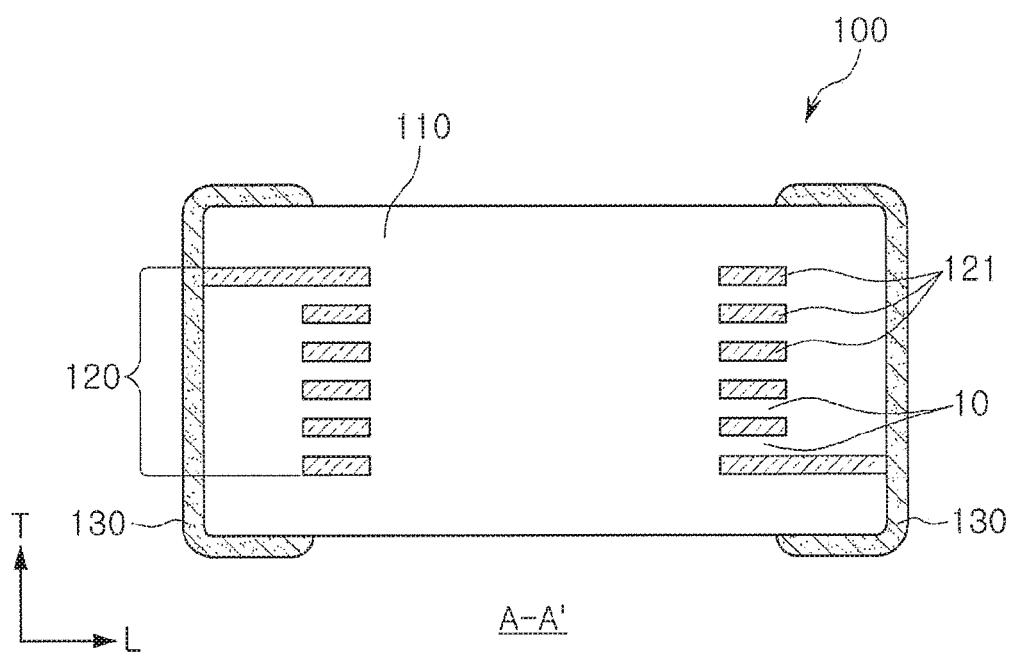
FIG. 2 is a cross-sectional view taken along line A-A' of FIG. 1.

FIG. 1 is a partially cut-away perspective view of a multilayer electronic component according to an embodiment in the present disclosure; and FIG. 2 is a cross-sectional view taken along line A-A' of FIG. 1.

Referring to FIGS. 1 and 2, a multilayer electronic component 100 according to an embodiment in the present disclosure may include a multilayer body 110 including a plurality of magnetic material layers 10, a coil shaped internal electrode 120 disposed in the multilayer body 110, and external electrodes 130 formed on outer surfaces of the multilayer body 110. The external electrodes 130 formed on the outer surfaces of the multilayer body 110 are electrically connected to the internal electrode 120 formed in the multilayer body 110.

In the multilayer electronic component 100 according to an embodiment in the present disclosure, a 'length direction' refers to an 'L' direction of FIG. 1, a 'width direction' refers to a 'W' direction of FIG. 1, and a 'thickness direction' refers to a 'T' direction of FIG. 1.

The multilayer body 110 may be formed to have a hexahedral shape having both end surfaces in the length L direction, both side surfaces in the width W direction, and upper and lower surfaces in the thickness T direction. Here, the thickness direction refers to a direction in which magnetic material layers 10 are stacked, for example, a stacking direction.

The multilayer body 110 may be formed by stacking a plurality of magnetic material layers 10. The plurality of magnetic material layers 10 may be in a sintered state, and adjacent magnetic material layers 10 may be integrated with each other so that boundaries therebetween are not readily apparent without a scanning electron microscope (SEM).

A shape and a dimension of the multilayer body 110 are not limited to a shape and a dimension shown in the embodiment, and a thickness of the magnetic material layer 10 may be arbitrarily changed in accordance with a capacity design of the multilayer electronic component 100.

A raw material forming the magnetic material layers 10 configuring the multilayer body 110 may be a metal magnetic particle, but is not necessarily limited thereto.

The metal magnetic particle may be formed using a soft magnetic alloy, for example, an alloy containing one or more selected from a group consisting of Fe, Si, Cr, Al, and Ni, in further detail, an Fe—Si—Cr based alloy.

Since the metal magnetic particle has a relatively large saturation magnetization value, the multilayer electronic component including the metal magnetic particles may secure a high level of direct current (DC) bias characteristics.

Here, in the multilayer electronic component according to an embodiment in the present disclosure including the metal magnetic particles, in the case in which metal magnetic particles are sintered at a relatively high temperature as in the case in which ferrite is sintered, magnetic characteristics may be deteriorated due to excessive oxidation of the metal magnetic particles. Therefore, the metal magnetic particles may be heat-treated at a temperature of about 700 to 800° C. lower than a general ferrite sintering temperature by about 100 to 200° C. to form oxide films on surfaces of the metal magnetic particles, thereby maintaining high magnetic characteristics and securing an insulation property between metal magnetic particles.

Although a multilayer electronic component including the metal magnetic particles as in an embodiment in the present disclosure has an advantage in that DC bias characteristics are improved, since it has a sintering temperature lower than that of a multilayer electronic component including general ferrite, the internal electrode 120 formed in the multilayer body 110 is not sufficiently sintered, such that electrical characteristics may be deteriorated.

Therefore, in an embodiment, the internal electrode 120 is formed using a conductive metal and glass containing a vanadium (V) oxide to promote sintering at a relatively low sintering temperature, whereby the internal al electrode having excellent specific resistance characteristics and a dense fine structure may be implemented and the above-mentioned problem may be solved.

The internal electrode 120 according to an embodiment in the present disclosure may have a coil shape and may be formed by electrically connecting conductive patterns 121 formed to have a predetermined thickness on the plurality of magnetic material layers 10 to each other.

The conductive pattern 121 may be formed by applying a conductive paste for an internal electrode containing conductive metal and glass containing vanadium (V) oxide to the magnetic material layer 10 by a printing method, or the like. As a method of printing the conductive paste, a screen printing method, a gravure printing method, or the like, may be used. However, the present disclosure is not limited thereto.

Vias may be formed in predetermined positions in the respective magnetic material layers 10 on which the conductive patterns 121 are printed, and the conductive patterns 121 formed on the respective magnetic material layers 10 may be electrically connected to each other through the vias to form one coil shaped internal electrode 120.

The conductive metal forming the internal electrode 120 is not particularly limited as long a it has excellent electrical conductivity. For example, as the conductive metal, silver (Ag), palladium (Pd), aluminum (Al), nickel (Ni), titanium (Ti), gold (Au), copper (Cu), platinum (Pt), or the like, may be used alone, or a mixture thereof may be used.

The glass may be used in order to sinter the internal electrode 120 at a relatively low temperature to densify the internal electrode 120. The glass may be dispersed and liquefied in the conductive paste to serve to promote movement of the conductive metal, thereby enabling the internal electrode 120 to be sintered at a relatively low temperature. In addition, pores in the sintered internal electrode 120 may be filled with the glass having good fluidity so as to improve sintering density and electrical characteristics.

According to an embodiment in the present disclosure, the glass containing the vanadium (V) oxide is used to promote sintering of the internal electrode at a relatively low heat treatment temperature, in detail, at a low sintering temperature in the case of the multilayer electronic component including the metal magnetic particles, whereby the internal electrode having excellent specific resistance characteristics and a dense fine structure may be implemented.

The glass may contain 10 to 30 mol % of vanadium (V) oxide. The vanadium (V) oxide may be added to the glass in a range of 10 to 30 mol % to decrease a softening temperature of glass. For example, the softening temperature of the glass may be controlled to be in a range of 450 to 600° C. The softening temperature of the glass is decreased to 600° C. or less, whereby the sintering of the internal electrode may be promoted at a relatively low heat treatment temperature.

In the case in which a content of the vanadium (V) oxide is less than 10 mol % or exceeds 30 mol %, the softening temperature of the glass may not be in the above-mentioned range, specific resistance characteristics may not be improved, particle growth may be limited, and it may be difficult to implement a dense fine structure, for example, pores may be present.

The glass may further contain one or more selected from a group consisting of a silicon (Si) oxide and a boron (B) oxide, one or more selected from a group consisting of a lithium (Li) oxide, potassium (K) oxide, and a calcium (Ca) oxide, and one or more selected from a group consisting of a titanium (Ti) oxide and an aluminum (Al) oxide.

For example, the glass may contain a (Si, B) -b(Li, K, Ca) -c(V) -d(Ti, Al), wherein a refers to a molar ratio of one or more selected from the group consisting of the silicon (Si) oxide and the boron (B) oxide, b refers to a molar ratio of one or more selected from the group consisting of the lithium (Li) oxide, the potassium (K) oxide, and the calcium (Ca) oxide, c refers to a molar ratio of the vanadium (V) oxide, and d refers to a molar ratio of one or more selected from the group consisting of the titanium (Ti) oxide and the aluminum (Al) oxide.

Here, according to an embodiment in the present disclosure, a, b, c, and d may satisfy a+b+c+d=100 mol %, 30 mol %≤a≤60 mol %, 10 mol %≤b≤30 mol %, 10 mol %≤c≤30 mol %, and 1 mol %≤d≤20 mol %.

The internal electrode 120 contains the glass satisfying the molar ratios of the respective oxides, whereby specific resistance characteristics, particle growth, and sintering density of the internal electrode may be improved.

A content of the glass contained, in the internal electrode 120 may be in a range of 0.1 to 1 wt %.

In the case in which the content of the glass contained in the internal electrode 120 is less than 0.1 wt %, it may be difficult to implement a liquid sintering mechanism due to the glass, an effect such as improvement of density through the filling of pores, or the like, may not be exhibited, and a sintering temperature rises, such that electrical characteristics may be deteriorated and reliability may be decreased.

Meanwhile, in the case in which the content of glass contained in the internal electrode 120 exceeds 1 wt %, the glass may form an excessive amount of liquid phase to increase a movement distance of the conductive metal and decrease a contact point, thereby hindering sintering, and an excessive amount of glass, a non-conductive material, may be present in a grain boundary of the conductive metal to decrease electrical conductivity of the internal electrode. In addition, a side effect such as lumping or floating of glass within the internal electrode may occur, so as not to contribute to sintering the internal electrode.

According to an embodiment in the present disclosure, in the internal electrode 120, a weight ratio of the vanadium (V) oxide to the conductive metal may be in a range of 0.00025 to 0.00500. The weight ratio of the vanadium (V) oxide to the conductive metal is in the above-mentioned range, whereby specific resistance characteristics, particle growth, and sintering density of the internal electrode 120 may be improved.

Next, a conductive paste composition for an internal electrode, for forming the internal electrode of the multilayer electronic component according to an embodiment in the present disclosure will be described.

The conductive paste composition for an internal electrode according to an embodiment in the present disclosure may contain a conductive metal and glass, and the glass may contain vanadium (V) oxide.

The vanadium (V) oxide, a network forming oxide component such as a silicon (Si) oxide or a boron (B) oxide, may have good glass forming capability and serve to alleviate a network structure, thereby decreasing softening temperature of glass.

The conductive paste composition for an internal electrode may be applied to magnetic material sheets by a printing method, or the like, to form conductive patterns, and the conductive patterns may be sintered at a predetermined temperature to form the internal electrodes.

Here, the conductive paste composition for an internal electrode may contain the conductive metal and the glass containing a vanadium (V) oxide to promote sintering at a relatively low sintering temperature, whereby the internal electrode having excellent specific resistance characteristics and a dense fine structure may be implemented.

The glass may further contain one or more selected from a group consisting of a silicon (Si) oxide and a boron (B) oxide, one or more selected from a group consisting of a lithium (Li) oxide, a potassium (K) oxide, and a calcium (Ca) oxide, and one or more selected from a group consisting of a titanium (Ti) oxide and an aluminum (Al) oxide.

For example, the glass may contain a (Si, B) -b(Li, K, Ca) -c(V) -d(Ti, Al), wherein a refers to a molar ratio of one or more selected from the group consisting of the silicon (Si) oxide and the boron (B) oxide, b refers to a molar ratio of one or more selected from the group consisting of the lithium (Li) oxide, the potassium (K) oxide, and the calcium (Ca) oxide, c refers to a molar ratio of the vanadium (V) oxide, and d refers to a molar ratio of one or more selected from the group consisting of the titanium (Ti) oxide and the aluminum (Al) oxide.

Here, according to an embodiment in the present disclosure, a, b, c, and d may satisfy a+b+c+d=100 (mol %), 30 mol %≤a≤60 mol %, 10 mol %≤b≤30 mol %, 10 mol %≤c≤30 mol %, and 1 mol %≤d≤20 mol %.

A content of the glass contained in the conductive paste composition for an internal electrode may be in a range of 0.1 to 1 wt %. The content of the glass contained in the conductive paste composition for an internal electrode may be in the range of 0.1 to 1 wt % to promote movement of the conductive metal due to liquefaction of glass, thereby enabling the conductive metal to be sintered at a relatively low temperature, and pores of the sintered internal electrode may be filled with the glass having good fluidity so as to improve sintering density and electrical characteristics.

In the case of the conductive paste composition for an internal electrode, a weight ratio of the vanadium (V) oxide with respect to the conductive metal may be in a range of 0.00025 to 0.00500. The internal electrode is formed using the conductive paste composition in which the weight ratio of the vanadium (V) oxide with respect to the conductive metal is in the above-mentioned range, whereby specific resistance characteristics, particle growth, and sintering density of the internal electrode may be improved.

A description of features that are the same as those of the multilayer electronic component according to the foregoing embodiment described above will be omitted.

The following Table 1 shows evaluation results of specific resistance characteristics and fine structures of the internal electrode, depending on a composition of glass and an amount of added glass.

A conductive paste was prepared by appropriately mixing three kinds of silver (Ag) powders having three average particle sizes of 2.5 μm, 1 μm, and 0.3 μm with each other and adding and mixing a small amount of ethyl cellulose based resin, organic solvent, and a glass powder to and with the silver (Ag) powders. Here, a composition and an amount of the added glass may be changed depending on each of Embodiments and Comparative Example of the following Table 1.

Conductive patterns were formed on magnetic material sheets through screen printing using the prepared conductive paste and were heat-treated at predetermined temperatures (700° C., 750° C., and 800° C.) for one hour to evaluate specific resistances and fine structures.

TABLE 1

| | Glass Composition (mol %) a(Si, B)-b(Li, K, Ca)-c(V)-d(Ti, Al) | | | | Amount (wt %) of Added Glass | Weight Ratio of V Oxide to Ag | Characteristics | | | |
|---|---|---|---|---|---|---|---|---|---|---|
| | | | | | | | Specific Resistance [Ωcm] | | | Fine |
| | a | b | c | d | | | 700° C. | 750° C. | 800° C. | Structure |
| Embodiment 1 | 48 | 25 | 12 | 15 | 0.1 | 0.00027 | 2.68 | 2.45 | 2.36 | ○ |
| Embodiment 2 | 48 | 25 | 12 | 15 | 0.2 | 0.00055 | 2.58 | 2.25 | 2.34 | ○ |
| Embodiment 3 | 48 | 25 | 12 | 15 | 0.3 | 0.00082 | 2.73 | 2.41 | 2.36 | ○ |
| Embodiment 4 | 48 | 25 | 12 | 15 | 0.5 | 0.00136 | 2.51 | 2.34 | 2.44 | ○ |
| Embodiment 5 | 48 | 25 | 12 | 15 | 1.0 | 0.00274 | 2.75 | 2.41 | 2.66 | Δ |
| Embodiment 6 | 48 | 25 | 12 | 15 | 1.5 | 0.00414 | 3.42 | 3.26 | 2.97 | x |
| Embodiment 7 | 42 | 21 | 25 | 12 | 0.1 | 0.00049 | 2.73 | 2.38 | 2.40 | ○ |
| Embodiment 8 | 42 | 21 | 25 | 12 | 0.2 | 0.00099 | 2.60 | 2.29 | 2.35 | ○ |
| Embodiment 9 | 42 | 21 | 25 | 12 | 0.3 | 0.00148 | 2.64 | 2.31 | 2.30 | ○ |
| Embodiment 10 | 42 | 21 | 25 | 12 | 0.5 | 0.00245 | 2.72 | 2.35 | 2.47 | ○ |
| Embodiment 11 | 42 | 21 | 25 | 12 | 1.0 | 0.00493 | 2.84 | 2.52 | 2.48 | ○ |
| Embodiment 12 | 42 | 21 | 25 | 12 | 1.5 | 0.00745 | 3.32 | 3.08 | 2.89 | x |
| Embodiment 13 | 32 | 16 | 43 | 9 | 0.3 | 0.00213 | 3.14 | 2.97 | 2.89 | Δ |

TABLE 1-continued

| | Glass Composition (mol %) a(Si, B)-b(Li, K, Ca)-c(V)-d(Ti, Al) | | | | Amount (wt %) of Added Glass | Weight Ratio of V Oxide to Ag | Characteristics | | | |
|---|---|---|---|---|---|---|---|---|---|---|
| | | | | | | | Specific Resistance [Ωcm] | | | Fine Structure |
| | a | b | c | d | | | 700° C. | 750° C. | 800° C. | |
| Embodiment 14 | 32 | 16 | 43 | 9 | 0.5 | 0.00354 | 3.36 | 3.04 | 2.91 | Δ |
| Embodiment 15 | 32 | 16 | 43 | 9 | 1.0 | 0.00712 | 3.58 | 3.26 | 3.14 | x |
| Embodiment 16 | 53 | 26 | 6 | 15 | 0.3 | 0.00049 | 3.26 | 3.04 | 2.90 | Δ |
| Embodiment 17 | 53 | 26 | 6 | 15 | 0.5 | 0.00082 | 3.14 | 2.97 | 3.02 | Δ |
| Embodiment 18 | 53 | 26 | 6 | 15 | 1.0 | 0.00164 | 3.44 | 3.02 | 3.16 | x |
| Comparative Example 1 | — | — | — | — | — | — | 3.27 | 2.92 | 2.71 | x |
| Comparative Example 2 | 65 | 25 | — | 10 | 0.5 | — | 3.46 | 3.35 | 3.05 | x |
| Comparative Example 3 | 56 | 28 | — | 16 | 0.5 | — | 3.15 | 2.92 | 2.88 | Δ |

<Fine Structure Evaluation>

O: Good (particle growth occurs, a dense fine structure is formed, and glass is not lumped or floated)

Δ: Normal (although particle growth occurs, some pores are present, and a small amount of glass is lumped or floated)

X: Bad (particle growth is suppressed, pores are present, and a large amount of glass is lumped or floated)

Referring to the above Table 1, in Embodiments 1 to 6, glass having a composition of 48(Si,B) -25(Li,K) -12(V) -15(Ti,Ca,Al) and a softening temperature of 497° C. was added in a range of 0.1 to 1.5 wt %. Specific resistance characteristics, particle growth, and sintering density were improved in Embodiments 1 to 5 in which 0.1 to 1.0 wt % of glass is added as compared with Comparative Example 1 in which glass is not added.

Figure 3:
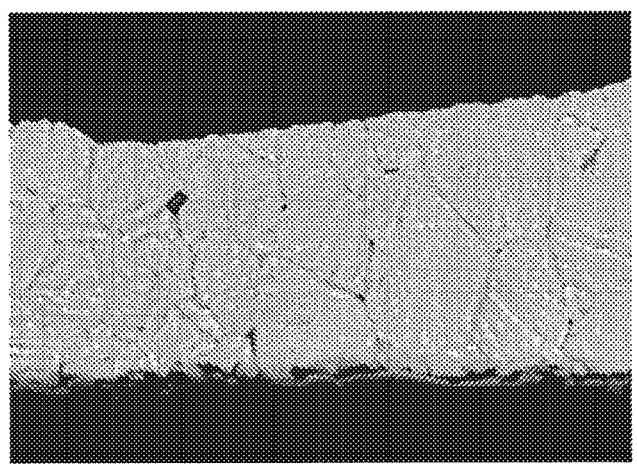
FIG. 3 is an image photograph obtained by observing an internal electrode of the multilayer electronic component according to an exemplary embodiment in the present disclosure, using a scanning electron microscope (SEM).

FIG. 3 is an image photograph obtained by observing an internal electrode according to a condition of Embodiment 2, which is an embodiment in the present disclosure, using a scanning electron microscope (SEM).

Referring to FIG. 3, it may be confirmed that in the case in which 0.2 wt % of the glass having the above-mentioned composition is added, large particle growth up to a level of about 10 μm occurred and a very dense fine structure was implemented.

However, in Embodiment 6 in which 1.5 wt % of the glass having the above-mentioned composition is added, due to an excessive amount of glass, a specific resistance rose, particle growth was limited, and the glass was lumped and floated, such that a fine structure became worse.

In Embodiments 7 to 12, glass having a composition of 42(Si,B) -21(Li, K) -25(V) -12(Ti,Ca,Al) and a softening temperature of 556° C. was added in a range of 0.1 to 1.5 wt %. Similar to Embodiments 1 to 6, in the case in which 0.1 to 1.0 wt % of glass is added, specific resistance characteristics, particle growth, and sintering density were improved. However, in the case in which 1.5 wt % of glass is added, a specific resistance rose and a fine structure became worse.

In Embodiments 13 to 15, glass having a composition of 32(Si,B) -16(Li,K) -43(V) -9(Ti,Ca,Al) and a softening temperature of 630° C. was added in a range of 0.3 to 1.0 wt %, In the case of the above-mentioned glass composition, a molar ratio of the vanadium (V) oxide was excessively large, such that specific resistance was not improved, particle growth was limited, and a dense fine structure was not obtained, for example, pores were present.

In Embodiments 16 to 18, glass having a composition of 53(Si,B) -26(Li,K) -6(V) -15(Ti,Ca,Al) and a softening temperature of 570° C. was added in a range of 0.3 to 1.0 wt %. In the above-mentioned glass composition, an amount of the vanadium (V) oxide was excessively small, such that specific resistance was not improved, particle growth was limited, and a dense fine structure was not obtained, for example, pores were present.

According to embodiments in the present disclosure, sintering of the internal electrode may be promoted at a relatively low heat treatment temperature to implement the internal electrode having excellent specific resistance characteristics and a dense fine structure, whereby electrical characteristics may be improved.

While exemplary embodiments have been shown and described above, it will be apparent to those skilled in the art that modifications and variations could be made without departing from the scope of the invention as defined by the appended claims.

What is claimed is:

1. A conductive paste composition for an electrode, comprising:
   a conductive metal and glass,
   wherein the glass contains a vanadium (V) oxide,
   one or more selected from a group consisting of a silicon (Si) oxide and a boron (B) oxide;
   one or more selected from a group consisting of a lithium (Li) oxide, a potassium (K) oxide, and a calcium (Ca) oxide; and
   one or more selected from a group consisting of a titanium (Ti) oxide and an aluminum (Al) oxide.

2. The conductive paste composition for an electrode of claim 1, wherein when a molar ratio of one or more selected from the group consisting of the silicon (Si) oxide and the boron (B) oxide is defined as a, a molar ratio of one or more selected from the group consisting of the lithium (Li) oxide, the potassium (K) oxide, and the calcium (Ca) oxide is defined as b, a molar ratio of the vanadium (V) oxide is defined as c, and a molar ratio of one or more selected from the group consisting of the titanium (Ti) oxide and the aluminum (Al) oxide is defined as d, a, b, c, and d satisfy a+b+c+d=100 mol %, 30 mol %≤a≤60 mol %, 10 mol %≤b≤30 mol %, 10 mol %≤c≤30 mol %, and 1 mol %≤d≤20 mol %.

3. The conductive paste composition for an electrode of claim 1, wherein a content of the glass ranges from 0.1 to 1 wt %.

4. The conductive paste composition for an electrode of claim 1, wherein a weight ratio of the vanadium (V) oxide with respect to the conductive metal is in a range of 0.00025 to 0.00500.

5. The conductive paste composition for an electrode of claim 1, wherein the conductive metal comprises one or more selected from a group consisting of silver (Ag), palladium (Pd), aluminum (Al), nickel (Ni), titanium (Ti), gold (Au), copper (Cu), and platinum (Pt).

* * * * *